Nov. 15, 1966  R. R. PINTAR  3,286,110
PERMANENT MAGNET ALTERNATOR
Filed Feb. 2, 1961  2 Sheets-Sheet 1
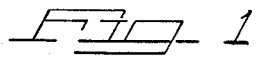
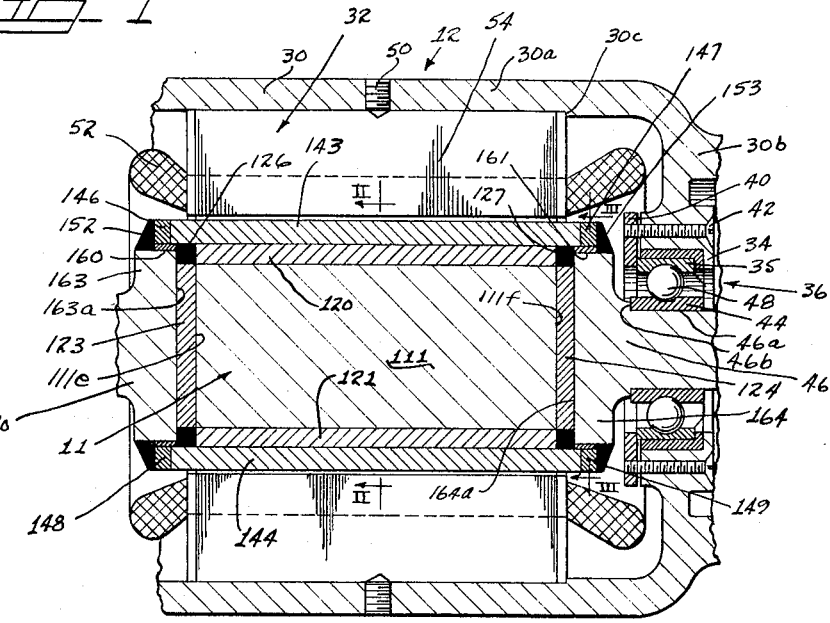
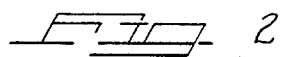
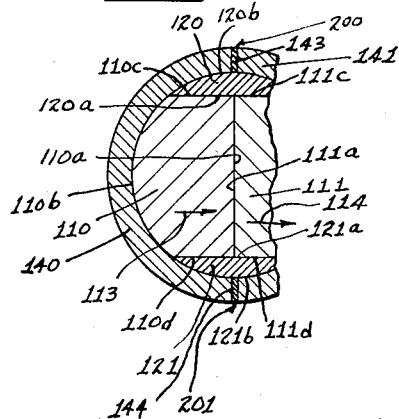
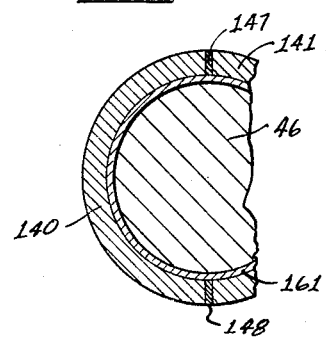
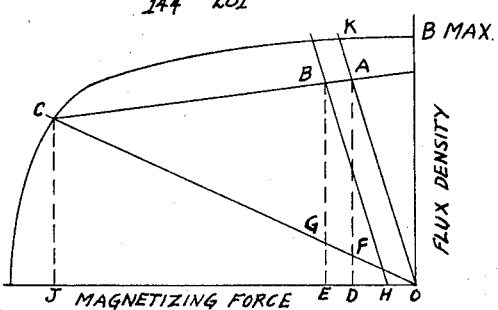
Inventor
Robert R. Pintar

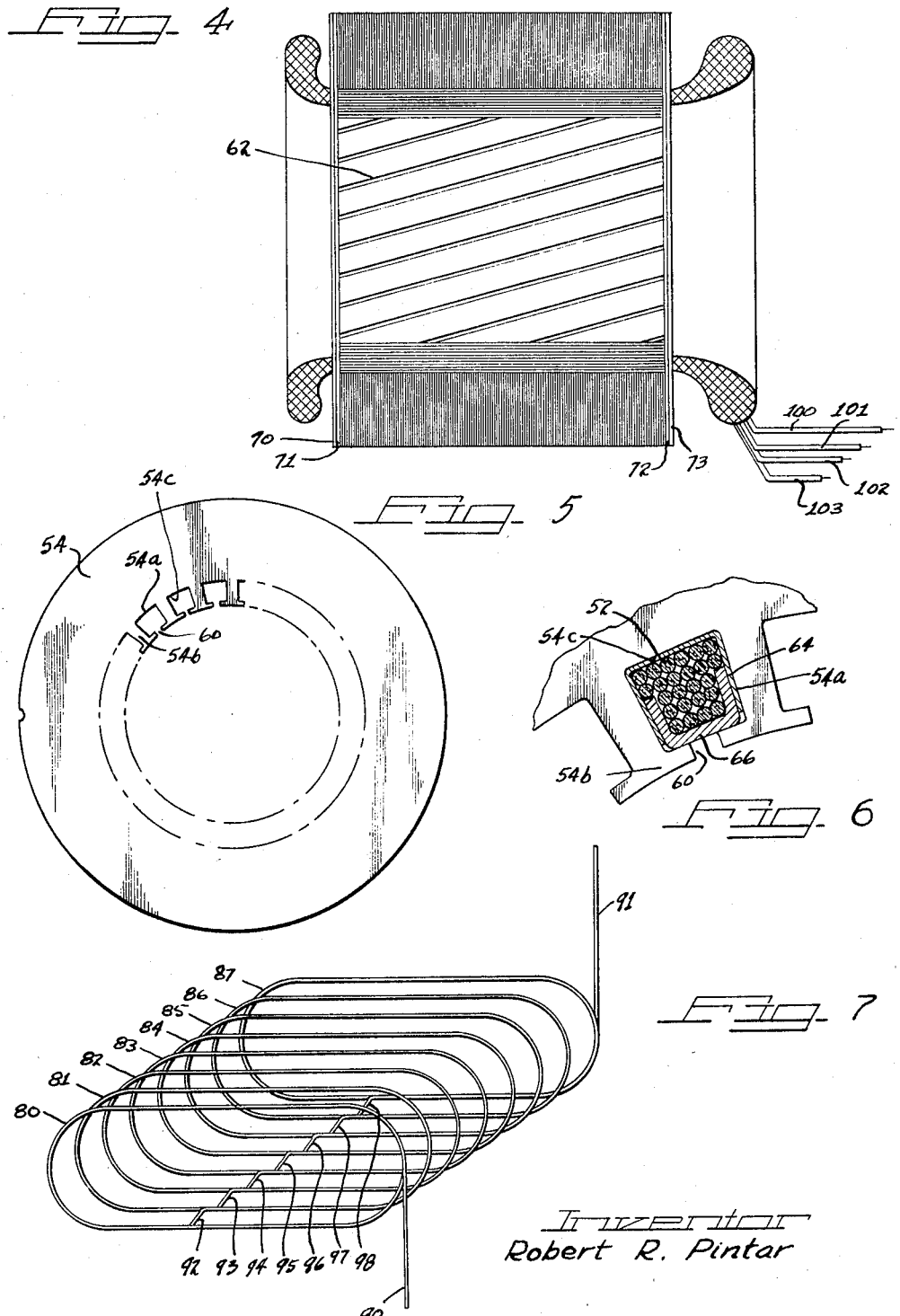

United States Patent Office 3,286,110
Patented Nov. 15, 1966

3,286,110
PERMANENT MAGNET ALTERNATOR
Robert R. Pintar, Diamond Bar, Calif., assignor to TWR Inc., a corporation of Ohio
Filed Feb. 2, 1961, Ser. No. 86,791
3 Claims. (Cl. 310—156)

This invention relates to an alternator assembly which is particularly designed for use in various types of aircraft such as airplanes, rockets, missiles and the like, although various features of the invention may have general application.

In any alternator system, and particularly in aircraft systems, it is desirable to have the highest possible ratio of power output to weight or size and it is desirable to have stable, reliable and efficient operation. It is therefore a general object of this invention to provide an alternator having these desirable features.

Another object of the invention is to provide an alternator assembly having a rotor of novel magnetic design providing substantially optimum magnetic energy output therefrom.

Another object of the invention is to provide an alternator assembly accommodating the use of grain oriented permanent magnetic materials in the rotor thereof.

A further object of the present invention is to provide a rotor assembly having the foregoing characteristics which is easily and economically manufactured.

Other objects, features and advantages of the present invention will become apparent from the following detailed description taken in connection with the accompanying drawings, in which:

FIGURE 1 is a longitudinal sectional view of an alternator assembly in accordance with the present invention;

FIGURE 2 is a cross sectional view taken generally along the line II—II of FIGURE 1;

FIGURE 3 is a cross sectional view taken along the line III—III of FIGURE 1;

FIGURE 4 is a somewhat diagrammatic longitudinal sectional view showing the construction of the stator;

FIGURE 5 is an elevational view showing one stator lamination;

FIGURE 6 is a fragmentary cross sectional view showing details of the stator assembly;

FIGURE 7 is a diagrammatic perspective view of one stator winding group; and

FIGURE 8 is a graph illustrating the operating characteristics of the permanent magnet of the alternator assembly.

The illustrated alternator assembly may advantageously comprise a component of a unitary power generating and control system driven by means of a turbine which may be carried directly on the shaft 10. A system of this type is illustrated in Robert L. Anderson application Serial No. 656,646, filed May 2, 1957, now Patent No. 3,052,958, and entitled "Alternator Assembly" and the disclosure of said Anderson application is incorporated herein by reference to provide an illustrative overall environment in which the alternator of the present invention may advantageously be employed. The shaft 10 may drive the rotor assembly 11 of the main alternator indicated at 12 which forms the subject matter of the present invention and may also drive one or more auxiliary alternators such as a parasitic load alternator (not shown) the rotor of which may be fixed to shaft 10. The parasitic alternator may function to control the speed of operation by providing an increasing load on the turbine or other source of motive power in response to increased speed of rotation of the shaft 10. The source of motive power must, of course, be such that its speed of operation is decreased when the load on shaft 10 is increased. If the speed of shaft 10 decreases, the parasitic alternator 14 is so controlled as to supply a decreased amount of power to its load thereby tending to restore the desired speed of operation. Suitable bearing means (not shown) may be provided for the shaft 10 to the left of the parasitic alternator.

The primary alternator 12 of the present invention may be a three phase, 400 cycle per second grounded type having a suitable passive network connected in its output circuit to provide optimum voltage regulation characteristics as described in said Anderson application.

The shaft 10 is preferably operated at a high speed such as 24,000 revolutions per minute to provide a maximum ratio of power output to size and weight and the rotor 11 may have two poles to develop the 400 cycle per second electrical output. Where a turbine is utilized to drive the shaft 10, high speeds are advantageous since the turbine provides a higher efficiency and a higher power output at a high rate of speed. A housing 30 may enclose the various parts including the turbine (not shown) and the alternator 12. The cylindrical portion 30a of the housing has an open end of diametric extent to receive the stator laminations 32 whose outside diameter is substantially equal to the minimum inside diameter of the cylindrical portion 30a of the housing from the open end thereof. After assembly of the stator 32, the housing open end is closed by means of a suitable end plate (not shown).

The housing 30 further includes an internal boss or wall 30b which is axially bored to provide a shoulder 34 to receive and abut the outer ring 35 of a ball bearing assembly indicated generally at 36. The ball bearing assembly 36 is retained in place by a clamping ring 40 secured to the boss 30b by screws such as indicated at 42 threadedly engaging the clamping ring 40 so as to draw the ring toward the wall 30b in clamping the outer ring 35 of the ball bearing assembly in place. The inner race 44 of the bearing assembly snugly fits into a reduced portion 46a of a shaft 46 secured to the opposite end of the rotor assembly 11 and abuts a shoulder 46b of the shaft. Balls 48 between the races 35 and 44 provide the bearing support for the shaft 46. It will be noted that the stator assembly seats against an internal shoulder 30c of the housing 30 and is secured in place by means such as a set screw indicated at 50 in FIGURE 1.

The alternator 12 is of a permanent magnet type and the stator 32 may have a series of windings 52 associated with a stack of laminations of magnetic material. By way of example, a suitable stator assembly has been illustrated in FIGURES 4, 5 and 6. Each individual lamination 54 may have a series of 24 slots 54a spaced about the inner periphery thereof to define a series of 24 pole portions 54b having small gaps 60 therebetween. As indicated in FIGURE 4, the pole portions 54b of the successive laminations are circumferentially offset so that the gaps 60 define oblique slots such as indicated at 62 in the diagrammatic illustration of FIGURE 4. The slots 62 may be skewed by a circumferential distance equal to twice the separation between successive slots over the axial extent thereof. In one embodiment in accordance with the present invention the laminations were approximately .007 inch thick and about 393 laminations were stacked to provide the stator assembly. The outside diameter of each lamination was approximately 3.612 inches while the inside diameter was approximately 1.882 inches. The gaps 60 had an extent of approximately .060 inch and the slots 54a had a depth in the radial direction of approximately .197 inch and a width in the circumferential direction tapering from about .218 inch to about .166 inch. Each of the slots 62 is provided with suitable insulating strips such as indicated at 64 and 66 in FIGURE 6 for proper insulation of the stator winding 52. A pair of insulator laminations as indicated at 70–73 may be provided at the respective ends of the magnetic laminations 54 and insulator laminations 70–73 may be approximately .031 inch thick and may have 24 slots equally spaced about the interior periphery thereof registering with the grooves 62 and having a width of approximately .218 inch and a radial depth of approximately .174 inch, with the interior diameter of the insulator laminations being approximately 2.000 inches. Thus, the bottoms of the grooves in the insulation laminations 70–73 are on the same diameter substantially as the bottom 54c of the slots 54a.

The stator winding may comprise three phase groups with eight coils per group. FIGURE 7 illustrates one group having a series of eight coils 80–87 with a lead 90 connected with the beginning of coil 80 and a lead 91 extending from the last coil 87 and leads 92–98 connecting the successive coils 80–87 in series between leads 90 and 91. By way of example each coil may comprise two wires connected in parallel and wound six turns per coil. From FIGURE 6, it will be seen that each slot may receive 24 wire cross sections corresponding to two coil cross sections per slot. As indicated in FIGURE 7, the output from the stator may be by means of a common neutral conductor 100 connected with one lead of each group and three phase output conductors 101, 102 and 103 connected to the other output lead of each coil group to provide a three phase output from the alternator.

The rotor assembly 11 in the illustrated embodiment comprises a pair of half sections 110 and 111 of permanent magnet material having planar mating faces 110a and 111a in contact along the longitudinal axis of the rotor. By virtue of the flat planar surfaces 110a and 111a, the permanent magnet sections 110 and 111 may be of a grain oriented permanent magnet material such as Alnico V (DG) which has a composition of 24% cobalt, 14% nickel, 8% aluminum, 3% copper by weight and the remainder iron. In the present instance, the grain structure of the magnetic material is oriented in the direction of the arrows 113 and 114 in FIGURE 2 which is the direction of magnetization of the material. Formation of a grain oriented magnetic material requires contacting of the material by means of chill plates which can be only used on flat planar surfaces.

By way of example with respect to the specific dimensions of the rotor heretofore given, each magnet section may have a curved side such as 110b with a radius of curvature of approximately .938 inch and may have a height of approximately 1.375 inches along surfaces 110a and 111a. The length of the permanent magnet sections may be approximately 2.875 inches. As seen in FIGURE 2, the magnets are of generally rectangular cross section at the central portions thereof bounded by the flat surfaces 110c, 110d, 111c and 111d and end faces such as indicated at 111e and 111f in FIGURE 1. This is highly advantageous since optimum utilization of permanent magnet material is obtained when the magnet is of substantially constant cross section in the direction of magnetization. The present invention not only provides more efficient utilization of permanent magnet material but further the volume of permanent magnet material which can be used for a given size rotor is increased by utilizing a solid permanent magnet configuration as shown in FIGURE 2 rather than an annular configuration as illustrated in the aforementioned Anderson application Serial No. 656,646. The increase in volume of permanent magnet material is achieved without any appreciable increase in weight since the rotor shaft does not extend through the permanent magnet and its weight is reduced in approximate proportion to the increase in weight of permanent magnet material.

The rotor assembly includes a damper winding encircling the permanent magnet sections 110 and 111, and the winding comprises electrically conductive bars 120 and 121 having flat faces 120a and 121a mating with the flat faces 110c, 111c and 110d, 111d of the permanent magnet sections, and having outer curved sides 120b and 121b defining with the magnet curved sides such as 110b a cylindrical configuration. Electrically conductive disks 123 and 124 are disposed in mating engagement with the planar end faces 111e and 111f of the permanent magnet section 111 and the corresponding end faces of the magnet section 110, and these disks are electrically and mechanically connected to the bars 120 and 121 by means of circular welds 126 and 127. By way of example, the damper bars 120, 121 and disks 123 and 124 may be of aluminum and the welds 126 and 127 may also be aluminum.

To provide the required rotor flux leakage at short circuit conditions, parasitic air gaps are used in a retaining ring that surrounds the permanent magnet structure. The retaining ring is comprised of a pair of half sleeves 140 and 141 of magnetic material which are brazed together at their mating surfaces by means of a suitable non-magnetic brazing material such as copper to provide respective longitudinal gaps 143 and 144 in the magnetic circuit surrounding the permanent magnet sections 110 and 111. To rigidly determine the spacing between the stabilizing sleeve portions 140 and 141, spacer plates such as indicated at 146, 147, 148 and 149 are interposed between the longitudinal edges of the sleeve portions at the opposite axial ends thereof. These plates may have a width or axial extent of approximately .188 inch, a height or radial extent of approximately .265 inch and a thickness of approximately .0460 inch. The spacer plates may be of stainless steel or other non-magnetic material and thus define part of the non-magnetic longitudinally extending gaps between the sleeve portions 140 and 141.

The retaining ring segments 140 and 141 may be of a suitable magnetic steel material and may be welded to shaft portions 10 and 46 axially outwardly of the respective spacers 146–149 as indicated at 152 and 153 in FIGURE 1. The shaft sections 10 and 46 are also of a suitable magnetic steel material to provide portions of the stabilizing leakage path about the rotor. Non-magnetic bands such as indicated at 160 and 161 are mounted on the flange parts 163 and 164 of the shaft sections 10 and 46 with the inner axial edge faces of the bands 160 and 161 flush with the inner end faces 163a and 164a of the shafts 10 and 46. The welds 152 and 153 may be of non-magnetic material and may serve to secure the retaining ring parts 140 and 141 to each other and to the flange parts 163 and 164 of the shaft portions 10 and 46.

It may be noted that the disks 123 and 124 may be suitably soldered to the end faces such as 111e and 111f of the permanent magnet sections 110 and 111 and similarly the damper bars 120 and 121 may be suitably soldered to surfaces 110c, 111c, and 110d, 111d of the permanent magnet sections.

FIGURE 5 shows the operating characteristics of the permanent magnet for short circuit stabilization. Line OA represents the no load in-stator permeance produced by (1) the radial air gap clearance between the rotor assembly 11 and the stator laminations 32 and (2) the magnetic circuit of the stator laminations 32. Line OC represents the rotor leakage permeance established by (1) the effective parasitic air gap produced by the non-magnetic braze sections 143 and 144, FIGURE 2, (2) the effective parasitic air gap produced by the non-magnetic sections 160 and 161, FIGURES 1 and 3, and (3) the magnetic sections 140 and 141 of the retaining ring.

When fully charged, the magnet has a $B_{max}$ flux density as shown and will stabilize at point K when the charge is removed. Application of a short to the alternator leads demagnetizes the rotor magnets to point C. At this point, the magnets operate at a flux density equal to line CJ; however, all of this flux is rotor leakage flux. A negligible amount of stator useful flux is required to circulate the short circuit current.

Removal of the short circuit allows the magnet to recover along a minor hysteresis loop represented by line CA. This is the operating line following short circuit stabilization. At no load, the operating point is at A. The total magnet density is given by line AD. The stator useful flux producing output power is given by AF and the rotor leakage flux is represented by FD. Application of full load produces demagnetizing force due to the stator winding ampere turns and is shown as OH. This changes the operating point from A to B along the operating line. The stator useful flux is now represented by BG, and the rotor leakage flux by GE. Additional application of load will drive the operating point from B to C along the operating line. When short circuit conditions are reached, the magnet density is again given as CJ which is entirely rotor leakage flux. Removal of the short allows the magnet to recover as before, along the operating line. Thus from no load to short circuit, the magnet density varies only from AD to CJ. The parasitic flux paths in the rotor provide leakage paths at short circuit condition that prevent the magnet density from decreasing below the level of CJ.

An important advantage of the illustrated construction resides in the fact that the magnetic material including shell parts 140 and 141 and end flanges 163 and 164 serve to hold the permanent magnet assembly together, the respective parts being welded together. Thus, there is no reliance on the permanent magnet material for strength and the rotor assembly can be used up to very high speeds, for example 480,000 revolutions per minute with an outside diameter of approximately 1⅞ inches.

To prevent a stator tooth from bridging across the spacers 143 or 144 of the stabilizing sleeve, the sleeve can be flatted to a depth of about .020 inch to .030 inch from a circular configuration where indicated by reference numerals 200 and 201 in FIGURE 2. Even without the stabilizing sleeve including parts 140 and 141, the rotor configuration of the present invention provides better voltage regulation than is obtained with an annular type permanent magnet. The specific dimensional embodiment described herein provides a two pole alternator having an output of approximately 1000 watts at .85 power factor lagging.

It may be noted that the magnet sections may be copper plated on all surfaces except the mating planar surfaces 110a and 111a prior to the soldering thereof to the damper winding parts 120, 121, 123 and 124.

It will be understood that many modifications and variations may be effected without departing from the scope of the novel concepts of the present invention.

I claim as my invention:

1. An electric machine comprising a rotor assembly having permanent magnet means of solid cross section and having stub shaft means at the opposite sides of the permanent magnet means for mounting said rotor assembly for rotation on an axis intersecting said permanent magnet means, said permanent magnet means comprising a plurality of magnet sections with mating flat surfaces and a damper winding encircling a pair of said magnet sections at the respective mating surfaces thereof, said magnet sections being made of grain oriented material oriented and magnetized at right angles to said flat surfaces, and sleeve means surrounding said permanent magnet sections and said damper winding and having an interior surface conforming with exterior surface portions of said permanent magnet sections.

2. An electric machine comprising a two pole rotor assembly having two permanent magnet sections with continuous flat extended mating surfaces, said permanent magnet sections being of grain oriented permanent magnet material oriented and magnetized at right angles to said mating surfaces, and stub shaft means for mounting said permanent magnet sections for rotation about a central axis of the rotor assembly.

3. An electric machine comprising a two pole rotor assembly having two permanent magnet sections with flat extended mating surfaces, said permanent magnet sections being of grain oriented permanent magnet material oriented and magnetized at right angles to said mating surfaces, and shaft means for mounting said permanent magnet sections for rotation about a central axis of the rotor assembly, said permanent magnet sections having curved outer surface portions of segmental cylindrical configuration, means including a pair of half sleeves each having an interior surface engaging said curved outer surface portions of a respective one of said permanent magnet sections for retaining said permanent magnet sections in assembled relation, and magnetic gap means disposed between each of said half sleeves for magnetically separating said half sleeves.

References Cited by the Examiner

UNITED STATES PATENTS

| | | | |
|---|---|---|---|
| 2,519,895 | 8/1950 | Edwards | 310—156 X |
| 2,578,407 | 12/1951 | Ebeling | 310—152 X |
| 2,806,160 | 9/1957 | Brainard | 310—156 |
| 2,831,992 | 4/1958 | Blackman | 310—156 |
| 2,836,743 | 5/1958 | Braun | 310—156 |
| 2,927,229 | 3/1960 | Merrill | 310—156 X |
| 3,012,161 | 12/1961 | Puder | 310—156 |

FOREIGN PATENTS

| | | |
|---|---|---|
| 959,120 | 2/1957 | Germany. |
| 672,140 | 5/1952 | Great Britain. |

OTHER REFERENCES

Publication: Permanent Magnets and Their Application (1962) by Parker and Studders, pages 86 and 87.

MILTON O. HIRSHFIELD, *Primary Examiner.*

DAVID X. SLINEY, *Examiner.*

G. P. HAAS, *Assistant Examiner.*